S. BALLARD, Sr.

Churn.

No. 64,471.

Patented May 7, 1867.

Witnesses

Inventor

S. Ballard Sr.

United States Patent Office.

STEPHEN BALLARD, SR., OF SULLIVAN, INDIANA.

Letters Patent No. 64,471, dated May 7, 1867.

IMPROVEMENT IN CHURNS.

*The Schedule referred to in these Letters Patent and making part of the same.*

TO ALL WHOM IT MAY CONCERN:

Be it known that I, STEPHEN BALLARD, of Sullivan, in the county of Sullivan, and State of Indiana, have invented a new and useful Improvement in Churns; and I do hereby declare that the following is a full, clear, and exact description thereof, which will enable others skilled in the art to make and use the same, reference being had to the accompanying drawings, forming part of this specification, in which—

Similar letters of reference indicate like parts.

My invention has for its object to furnish an improved churn by means of which the churning may be done very rapidly and thoroughly; and it consists, first, in the combination of knives and hinged or jointed arms with the dasher-shaft; second, in the combination of a circular dasher with the dasher-shaft; third, in the combination of the side-screens with the sides of the churn; fourth, in the combination of the frame and gearing with the sides of the churn and with the lid or cover, as hereinafter more fully described.

Figure 1:
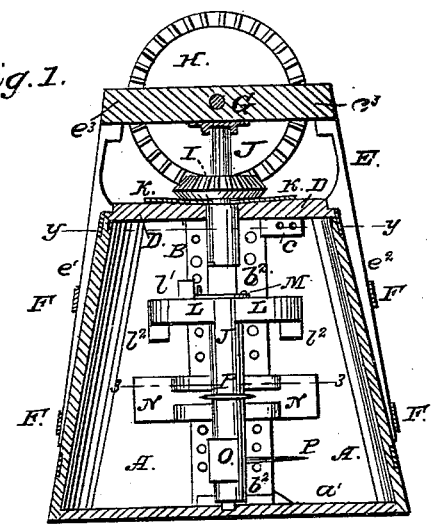
Figure 1 is a vertical central section of my improved churn, taken through the line $x\ x$, fig. 2.
Figure 2:
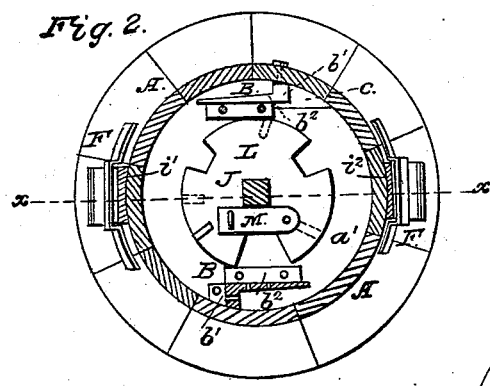
Figure 2 is a horizontal section of the same, taken through the line $y\ y$, fig. 1.
Figure 4:
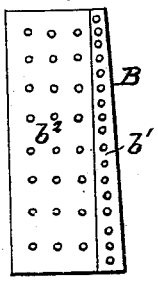
Figure 4 is a perspective view of the side screen.
Figure 3:
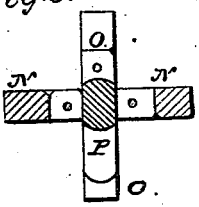
Figure 3 is a detail sectional view, taken through the line $z\ z$, fig. 1.
Figure 5:
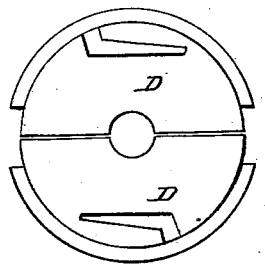
Figure 5 is an under side view of the lid or cover of the churn.

A is the body of the churn, which may be cylindrical, tapering, or barrel-shaped, as may be desired. B is the screen, which is formed of a narrow part, $b^1$, and a wider part, $b^2$. The edge of the narrow part $b^1$ is made to conform to the shape of the side of the churn against which it fits, but the other edge is vertical, and to it is securely attached the broader part $b^2$, so that the part $b$ may be parallel with the dasher-shaft. This screen is perforated with numerous holes, and as the dasher revolves the milk or cream is driven by it into the pockets formed by the screens B, and is compelled to find its way out through the holes in said screens, materially increasing the rapidity of the formation of the butter. The lower ends of the screens B rest in grooves formed in the bottom $a^1$ of the churn, or against blocks attached to said bottom. Their upper ends rest against blocks C, attached to the sides of the churn, and they are still further supported by their upper ends fitting into grooves formed in the lid or cover D, as shown in fig. 5. The lid or cover D is made in two parts for convenience in putting it on and taking it off, and its edges are notched, as shown in figs. 1 and 5, into which notches fit shoulders formed on the arms $e^1$ and $e^2$ of the frame E, which holds the cover securely in place. The arms $e^1$ and $e^2$ are made of such a form as to fit upon the outer side of the churn A, where they are held in place by clasps or keepers F, attached to the said sides. $e^3$ is the cross-bar of the frame, in which the crank-shaft G has its bearings. Upon the crank-shaft G is placed a bevel gear-wheel, H, which meshes into a smaller gear-wheel, I, attached to the dasher-shaft J, as shown in fig. 1. The dasher-shaft J is pivoted at its upper end in a socket attached to or formed in the under side of the cross-bar $e^3$ of the frame E, and at its lower end, in a socket formed in or attached to the bottom $a^1$ of the churn A, as seen in fig. 1. To the shaft J, immediately below the gear-wheel I, is attached a circular plate or disk, K, which catches any dirt that may fall from the gearing and prevents it from finding its way into the churn through the hole in the lid D. L is a circular dasher, having notches formed in its edge, one of which extends inward a little past the centre, and terminates in a square notch, into which fits a squared part of the dasher-shaft J, in which position the dasher L is held by a catch or button, M, pivoted to one side of the said dasher and held in place by a pin, as shown in figs. 1 and 2. The dasher-shaft J is squared at several points for the reception of the dasher L, so that the position of the dasher may be adjusted according to the amount of cream or milk in the churn. $l^1$ is a paddle projecting upward from the upper surface of the dasher L to gather the butter when the churning is about completed, and $l^2$ are paddles projecting downward from the lower side of the said dasher L, for the purpose of aiding in the agitation of the milk or cream. N and O are arms attached to the dasher-shaft J below the dasher. Each end of these arms is jointed, as shown in figs. 1 and 3, so that when the shaft J is revolved in one direction the said arms may pass through the milk or cream extended, but when revolved in the other direction the end parts of the arms may fold back. The arms N and O are attached to the shaft at right angles to each other, as shown in figs. 1 and 3. P are knives attached to the shaft J to interrupt the currents of milk or cream forced up and down by the arms N and O, thereby increasing the agitation of the said milk or cream, and promoting the formation of the butter.

I claim as new, and desire to secure by Letters Patent—

1. The combination of the knives P, and hinged or jointed arms N and O, with the dasher-shaft J, substantially as described and for the purpose set forth.

2. The combination of the circular dasher L, constructed as described with the dasher-shaft J, substantially as and for the purpose set forth.

3. The combination of the frame E and gearing G H I with each other, and with the sides and top or cover D of the churn A, substantially as described and for the purpose set forth.

STEPHEN BALLARD, Sr.

Witnesses:
 J. G. Riley,
 Ezekill Riley.